UNITED STATES PATENT OFFICE.

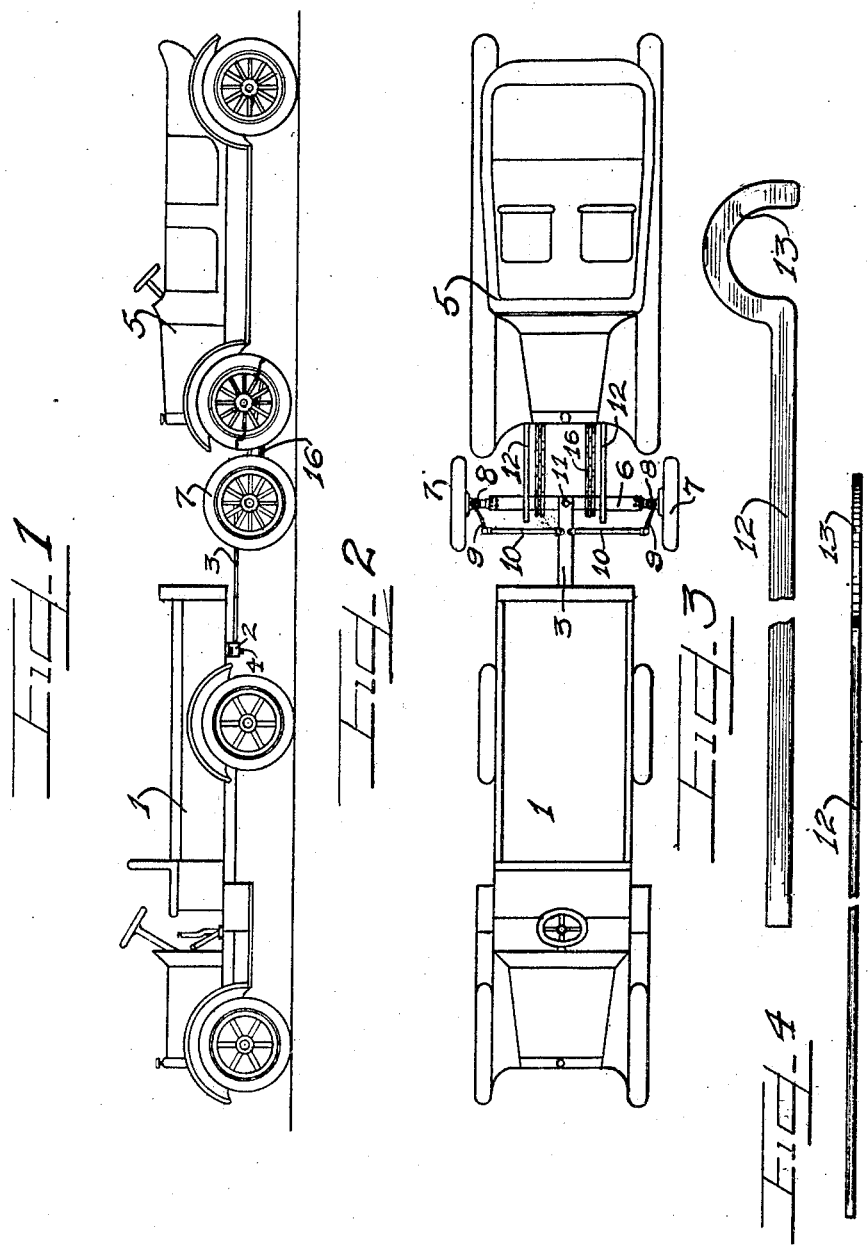

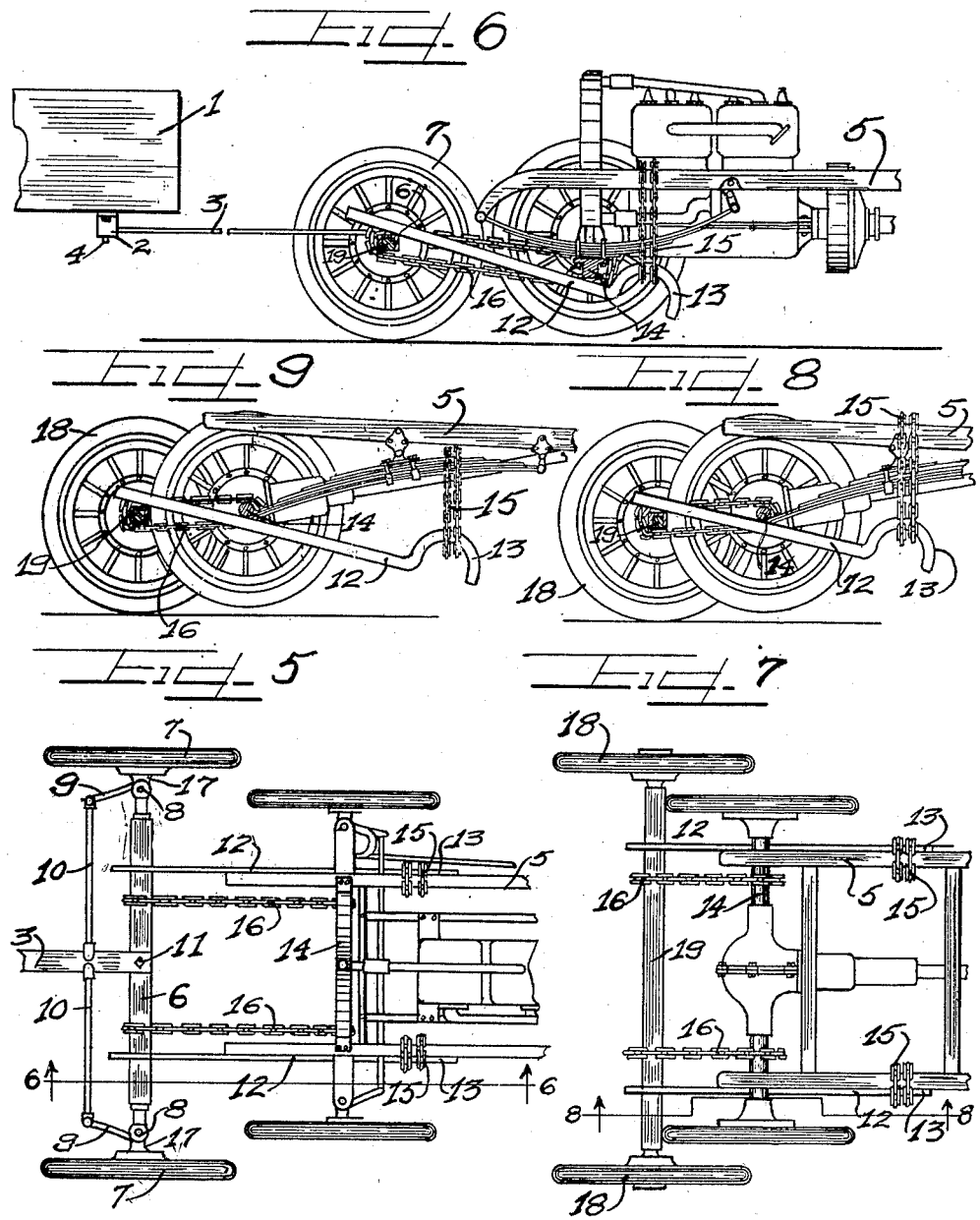

JAMES EGAN, OF CHICAGO, ILLINOIS.

TOWING ATTACHMENT.

1,332,388.  Specification of Letters Patent.  Patented Mar. 2, 1920.

Application filed July 8, 1918. Serial No. 243,760.

*To all whom it may concern:*

Be it known that I, JAMES EGAN, a citizen of the United States, and a resident of the city of Chicago, in the county of Cook and State of Illinois, have invented certain new and useful Improvements in Towing Attachments; and I do hereby declare that the following is a full, clear, and exact description of the same, reference being had to the accompanying drawings, and to the numerals of reference marked thereon, which form a part of this specification.

This invention has reference more particularly to an attachment for towing disabled automobiles which can be quickly and easily applied to any automobile.

When an automobile is damaged, and the running gear is not disabled, it is usually possible to drive the car under its own power or tow the car on its own running gear into a garage for repairs, and in such case no attachment is necessary except perhaps a tow line or rope for connecting the damaged car to the car whereby it is pulled into the garage. In many cases, however, the running gear is entirely wrecked or damaged to such an extent that it is incapable of serving to carry the car to the garage for repairs and other means must necessarily be provided for supporting and transporting the wrecked car. It is also desirable that the wrecked car may be prepared for hauling in very quickly and without the necessity of removing parts and making alterations, at the place where the wreck occurred, not only in order that traffic at that point may not be delayed, but also as it is usually difficult to work on the car at the place where the accident occurred owing to the unfavorable working conditions and the lack of necessary tools to do the work. To the end that this may be accomplished, I have provided a towing attachment for supporting the disabled automobile which may be easily and quickly connected or placed in position without alteration to the wrecked automobile, and with a minimum amount of labor.

It is an object therefore of my invention to provide a towing attachment for a disabled automobile, which may be easily and quickly placed in position and connected with the damaged car, and which is capable of universal use, that is, it is adapted to be applied to any car without special attachments being required for the particular make of car.

Another object of my invention is to provide a towing attachment whereby it is unnecessary to remove the wheels or otherwise alter the damaged automobile preparatory to connecting the towing attachment thereto.

Another object of my invention is to provide an auxiliary truck and levers adapted to coöperate therewith to support the damaged automobile on the truck.

Another object of the invention is to provide an auxiliary truck and lifting levers engaging at two points on the wrecked automobile and supported on the auxiliary truck, together with pulling connections between the truck and the wrecked vehicle whereby the wrecked vehicle is supported and capable of being towed.

Another object of the invention is to provide supporting levers for the disabled automobile and an auxiliary truck of a width greater than the width of the automobile so that it is capable of being placed in close proximity to the wrecked automobile to connect with the supporting levers.

Another object of the invention is to provide an auxiliary truck having steering mechanism, and levers for supporting the wrecked automobile on the auxiliary truck so that it may be properly towed.

Another object of the invention is to provide a lever for supporting a wrecked automobile so that it may be towed, the said lever being formed or provided with a lateral extension for holding the lever in the desired operating position.

Another object of the invention is to provide a flat supporting bar with means for holding the bar so as to support the wrecked automobile on the edge of the bar and thereby permit a bar or lever of light weight to be employed.

My invention also has other objects which will appear from the following specification and the accompanying drawings.

My invention (in a preferred form) is illustrated in the drawings and described in the following specification.

On the drawings:

Figure 1 is a side view of a disabled automobile with my towing attachment applied thereto and connected with another automobile for towing the disabled car.

Fig. 2 is a top view of the parts shown in Fig. 1.

Fig. 3 is a side view of the lever which I employ for supporting the wrecked automobile.

Fig. 4 is a top view of the lever shown in Fig. 3.

Fig. 5 is a top view of adjoining portions of the cars shown in Fig. 2, the body of the car to be towed being removed so as to show the manner of attaching my towing mechanism.

Fig. 6 is a view on the line 6—6 of Fig. 5.

Fig. 7 is a view similar to Fig. 5, showing my towing attachment as applied to the rear end of a disabled automobile.

Fig. 8 is a view on the line 8—8 of Fig. 7.

Fig. 9 is a view similar to Fig. 8, showing a different manner of attaching my towing mechanism to the car to be towed.

As shown on the drawings:

The reference numeral 1, indicates generally a wrecking car, which may be used for towing the disabled vehicle, and has the bracket 2, or other suitable means to which the end of the tongue or tow bar 3, for towing the disabled vehicle may be pivoted by means of the pin 4, or otherwise. The manner of connecting the tongue or tow bar 3, with the wrecking vehicle 1, may be varied according to the circumstances, it being essential only that the tongue 3, shall be connected with the wrecking vehicle 1, in such a manner that the disabled automobile may be towed thereby.

The reference numeral 5, indicates generally the disabled vehicle, which in Figs. 1, 2, 5 and 6 is indicated as having the front end thereof disabled, and is shown with the front end thereof connected and supported by my towing apparatus so that it may be readily towed at the rear of the wrecking vehicle 1.

Referring first to Figs. 1 to 6, inclusive, I provide an auxiliary truck consisting of the axle 6, and a wheel 7, at each end. These wheels are mounted on the brackets 17, which are pivoted on a vertical axis as at 8, to the axle 6, so that they may be turned for steering purposes and the brackets 17, have the arms 9, thereof, pivotally connected by means of the rods 10, to the tow bar 3, which is in turn pivoted at 11, to the axle 6, intermediate of the ends thereof, so that as the tow bar 3, is turned on the pivot 11, the wheels 7, correspondingly turn and the auxiliary truck is thereby steered.

The auxiliary truck is adapted to be placed close to the wrecked vehicle, and in some cases may be placed entirely thereunder, and for this purpose, the wheels 7, are spaced apart a greater distance than the width of the automobile so that it may be placed thereunder and have the wheels positioned at each side thereof, or may be placed in close position at the end of the wrecked automobile with the wheels 7, embracing the sides thereof.

For supporting the disabled automobile on the auxiliary truck, I employ a pair of levers 12, which are preferably a flat bar as shown in Figs. 3 and 4, which is comparatively thin as shown in Fig. 4, and of suitable width as shown in Fig. 3, so that it is strong enough to support the disabled automobile on the edge thereof. Obviously this bar or lever, unless made very heavy, is incapable of supporting the wrecked vehicle on the flat side thereof, owing to the fact that it is comparatively thin, whereas, if arranged to bear the load edgewise thereon, as shown in Figs. 6 and 7, it may be made comparatively light and is strong enough to support the load.

In order to hold the bar 12, in position to support the weight of the disabled vehicle on the edge thereof, I have provided a hook or lateral extension 13, which is connected to the frame of the disabled automobile, as hereafter described, so as to hold the lever in position so that the disabled vehicle rests on the edge of the lever.

To apply the towing attachment, the auxiliary truck is placed immediately adjacent the disabled end of the automobile and the two levers 12, are inserted under the axle 14, of the disabled vehicle, one at each side thereof, and have the outer ends thereof resting on the axle 6, of the auxiliary truck. The inner ends of the levers are drawn upwardly as shown in Figs. 5 and 6, so that the axle 6, serves as a fulcrum for the lever, and the lifting of the loop end 13, raises the axle 14, so that it clears the ground, and the end of the disabled vehicle is then supported entirely on the auxiliary truck. The loop end 13, of the lever is then connected with the frame of the disabled automobile as shown in Fig. 6, or with any other substantial part of the disabled automobile by means of the chains 15, or other connecting means, so that the loop end 13, is securely held and the end of the disabled vehicle is supported by the truck. A pair of chains 16, or other connecting means is then arranged to connect the axle 14, of the disabled vehicle, with the axle 6, of the auxiliary truck, so as to pull the disabled vehicle, by means of the auxiliary truck. From the foregoing, it will be noted that the levers 12, serve only to support the disabled vehicle, and the chains 16, to connect the auxiliary truck with the disabled vehicle to do the pulling, and to prevent the auxiliary truck from being pulled away from under the end of the levers 12.

In towing an automobile it is necessary to provide for steering the towed car so that it will properly follow the towing car. Ordinarily when the front end of the running gear is intact and the rear end damaged, the rear end may be supported on an auxiliary truck and a tow line attached to the front end of the disabled car and an operator rides in the disabled car and steers it with its own steering mechanism. When, however, the front end is damaged, other steering means must be provided and the auxiliary truck which I have described may be attached to the front end of the damaged car, and, by reason of its wheels being vertically pivoted and connected with the pivoted tongue or tow bar 3, as described, it is automatically steered and causes the disabled car to properly follow the towing car without attention.

For supporting the rear end of a disabled automobile, it is usually not necessary to use a steering truck such as I have previously described and I prefer to employ a truck, without steering attachments, such as shown in Figs. 7, 8 and 9, wherein the wheels 18, are pivoted directly on the ends of the axle 19. This truck also preferably has the wheels spaced apart a greater distance than the width of the automobile so that it may be connected close to the disabled car, and has the disabled car supported thereon and connected thereto by means of the levers 12, and chains 15 and 16, in the same manner as herein described for attaching the auxiliary steering truck.

When both ends of the running gear of the automobile are disabled, a truck is attached at each end thereof, and it is usually preferable, although not necessary, that the steering truck be attached to the front end of the damaged automobile and the plain truck without steering connections at the rear end.

It is also possible, in case of a rear end wreck, to use the steering truck at the rear end and pull the damaged car backward, in which case the front wheels may be locked or held by means of the steering mechanism against lateral movement. However, it is preferred to use a plain truck and attach a tow line to the front of the car and pull the car from the front as before mentioned.

I have shown my invention employing the straight bars 12, and the chains 16, for establishing the pulling connection between the auxiliary truck and the disabled vehicle as this is the form which is best adapted for general use, and is the simplest and most convenient form in which the invention may be practised. Moreover, a bar or lever in this form may be readily made, and the chain, rope or other similar means is easily available. However, the bar or lever 12, may be made with a hook at the outer end, which is adapted to engage the axle 6, of the auxiliary truck, or a clamp or other engaging means may be provided therefor, and the lever intermediate of its ends may be provided with a projection clamp or other means for engaging the axle 6, so that the chain 16, may be omitted and the bar itself may then serve to pull the disabled vehicle.

Also, the inner end of the lever 13, may be connected by means of a link or may be provided with a hook integral therewith which is adapted to engage over the frame of the disabled vehicle, or the chain 15, or other connecting means may be secured to the frame of the car as shown in Figs. 5, 6, 7 and 8 or may be secured to the spring as shown in Fig. 8 or to any other substantial part so as to provide the required connection.

The manner of using my towing apparatus may also vary according to circumstances and conditions which may make it more convenient to apply it in some cases in a different manner than it may be applied in others. The final result desired is to support the disabled vehicle in the manner similar to that indicated in the drawings, and in some cases it may be found convenient to insert the lever 12, under the axle 14, and have the outer ends engage over the axle 6 or 19, and then raise the inner end of the lever until the end of the disabled vehicle is sufficiently elevated and then apply the chain 15, or other connecting means to secure the inner end of the lever in the elevated position. In other cases, however, it may be found advisable to insert the lever under the axle 14, and first connect the inner end of the lever to the frame or other part of the disabled vehicle and then raise the outer end of the lever and roll the auxiliary truck under the elevated outer ends thereof, after which the chains 16, or other connecting means are applied to hold the auxiliary truck from separation from the disabled vehicle.

It is my intention to provide a wrecking device which is simple and comprises few parts and which can be quickly and easily applied to any disabled vehicle, and I have shown and described my apparatus in a convenient form for doing the work for which it is adapted.

However, I am aware that various changes and modifications may be made and I therefore do not purpose limiting the patent granted hereon, otherwise than necessitated by the prior art.

I claim as my invention:

1. A towing attachment for disabled automobiles comprising a pair of longitudinal members adapted to be connected with and project from the disabled automobile, and an auxiliary truck having a plurality of wheels for supporting the projecting ends of the longitudinal members for holding the disabled automobile in an elevated position.

2. A towing device for disabled automobiles comprising a longitudinal member projecting from and connected at separate places under the disabled automobile, a two wheeled auxiliary truck connected with the projecting end of the longitudinal member for supporting the automobile in an elevated position, a tow bar to connect said auxiliary truck to a towing vehicle to cause it to follow in the track of the towing vehicle.

3. In a towing attachment for disabled automobiles, the combination with the disabled automobile of a lever extending under and engaging the axle of the disabled automobile intermediate of its ends, means for connecting the inner end of the lever with the disabled automobile at a distance from the axle, an auxiliary truck having a plurality of wheels connected with the outer end of the lever to support the disabled automobile in an elevated position, and pulling means for connecting the auxiliary truck with the disabled automobile.

4. In a towing attachment for disabled automobiles, the combination with the disabled automobile of a pair of supporting levers extending under and engaging the disabled automobile intermediate of their ends, flexible means connecting the inner ends of the levers with the disabled automobile, and an auxiliary truck having a plurality of wheels and having a different wheel gage than the disabled automobile supporting the outer ends of the levers so as to hold the disabled automobile in an elevated position.

5. In a towing attachment for disabled automobiles, the combination of a pair of lifting levers extending under, and engaging the disabled automobile intermediate of their ends, flexible means connecting the inner ends of the levers with the disabled automobile, an auxiliary truck supporting the outer ends of the levers, steering means on said auxiliary truck to cause it to follow in the track of a towing vehicle and flexible pulling means connecting the auxiliary truck with the disabled vehicle.

6. In a towing attachment for disabled automobiles, the combination of an auxiliary truck, steering means on said auxiliary truck, a pair of lifting levers for supporting the disabled automobile on the auxiliary truck, flexible means for connecting one end of the levers with the disabled automobile, and flexible means for connecting the auxiliary truck with the disabled automobile.

7. Means for towing a disabled automobile comprising a pulling vehicle, an auxiliary truck interposed between the pulling vehicle and the disabled automobile, a pulling rod pivotally connecting the auxiliary truck and the vehicle, and a pair of levers extending under and connected with the disabled vehicle and having the outer ends thereof connected with the auxiliary truck for supporting the disabled vehicle in an elevated position, and pulling means connecting the auxiliary truck with the disabled vehicle.

8. Means for towing a disabled automobile comprising a plain truck at one end and a steering truck at the other end thereof supporting levers detachably connected with and projecting from each end of the automobile and connected at their outer ends with said trucks, and a tow bar connected with the steering truck.

In testimony whereof I have hereunto subscribed my name in the presence of two subscribing witnesses.

JAMES EGAN.

Witnesses:
  FRED E. PAESLER,
  CHARLES W. HILLS.